United States Patent
Chari et al.

(10) Patent No.: US 7,430,757 B1
(45) Date of Patent: Sep. 30, 2008

(54) OBLIVIOUS PROXYING USING A SECURE COPROCESSOR

(75) Inventors: Suresh Narayana Chari, Elmsford, NY (US); Matthias Kaiserwerth, Ridgefield, CT (US); Josyula R. Rao, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/227,770

(22) Filed: Jan. 8, 1999

(51) Int. Cl.
*G06K 9/00* (2006.01)
*G06F 15/173* (2006.01)
*G06F 15/16* (2006.01)

(52) U.S. Cl. .............................. 726/4; 713/160; 709/223

(58) Field of Classification Search ......... 713/200–201, 713/153, 160; 709/223–229; 726/1–4, 7, 726/11, 12–15, 26–27
See application file for complete search history.

(56) References Cited

U.S. PATENT DOCUMENTS

| | | | |
|---|---|---|---|
| 5,673,322 A * | 9/1997 | Pepe et al. ..................... 705/52 |
| 5,778,189 A * | 7/1998 | Kimura et al. .............. 709/236 |
| 5,935,212 A * | 8/1999 | Kalajan et al. .............. 709/228 |
| 6,003,084 A * | 12/1999 | Green et al. ................ 709/227 |
| 6,098,108 A * | 8/2000 | Sridhar et al. ............... 709/239 |
| 6,209,087 B1 * | 3/2001 | Cashman et al. ............ 712/300 |
| 6,314,108 B1 * | 11/2001 | Ramasubramani et al. .. 370/465 |
| 6,397,259 B1 * | 5/2002 | Lincke et al. ............... 709/236 |
| 6,400,729 B1 * | 6/2002 | Shimadoi et al. ............ 370/466 |

OTHER PUBLICATIONS

Electronic Engineering Times, 1997, n965.*
Token Ring et Penril, Lan Technology, v9, n2, p. 99(2), Feb. 1993.*

* cited by examiner

*Primary Examiner*—Gilberto Barrón, Jr.
*Assistant Examiner*—Jenise E. Jackson
(74) *Attorney, Agent, or Firm*—Thomas A. Beck; Lisa M. Yamonaco

(57) ABSTRACT

A method, apparatus and system is provided for an entity to facilitate secure communication between a client and server even when they do not support the same set of protocols without violating the trust model which requires that only the client and server be privy to the contents of the communication. In an embodiment this is accomplished by embedding at the site of the proxy an application running inside a secure coprocessor which translates between the protocols that the client supports and those that the server understands. The invention is also useful for purposes such as adaptation of content at the site of the proxy without violating the trust model between the client and the proxy. In general, the scheme describes mechanisms to securely delegate to the infrastructure the ability to enforce an arbitrary trust model between a set of clients and servers participating in some computational task.

7 Claims, 9 Drawing Sheets

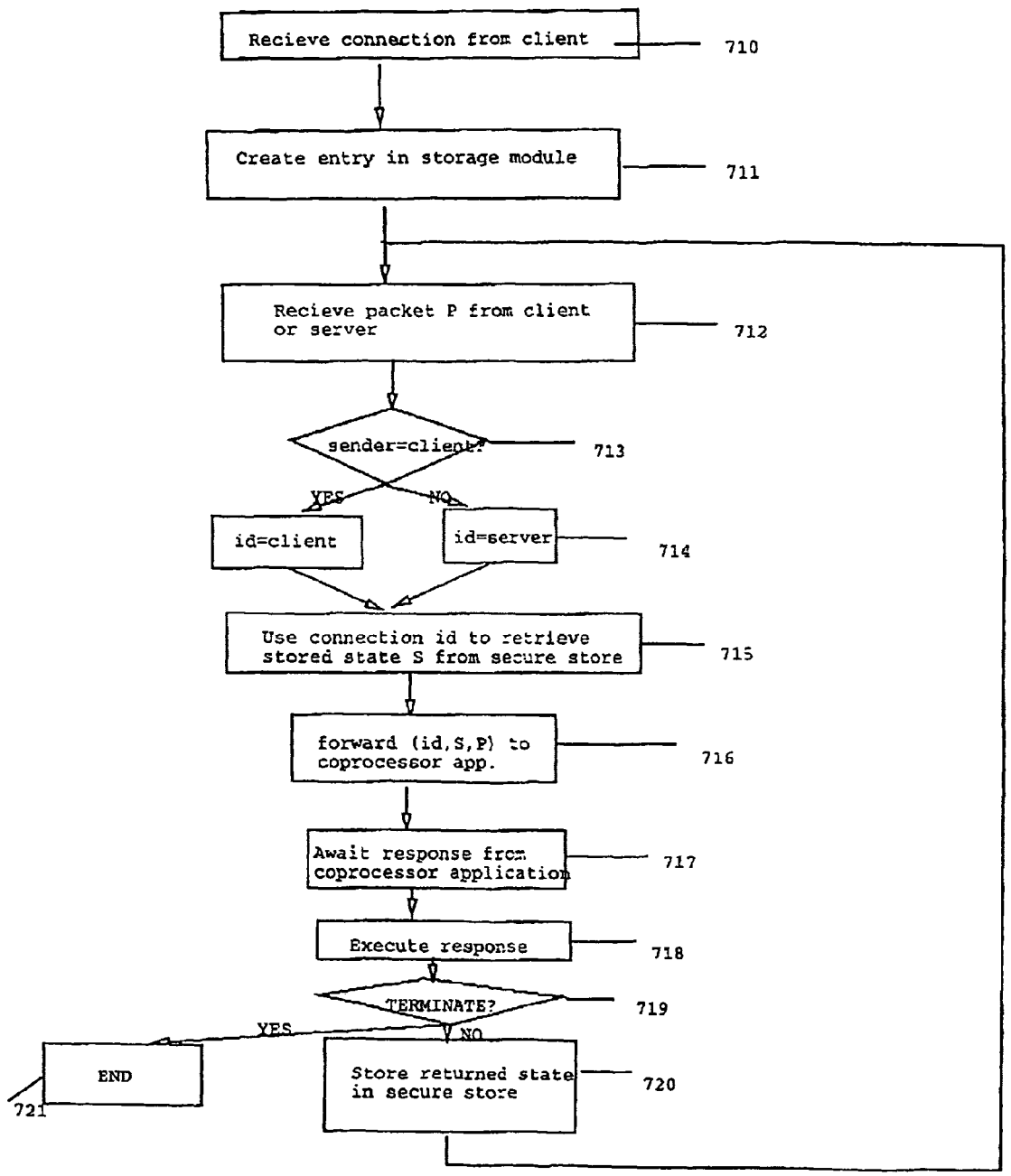
FIGURE 7(a): Description of software running on proxy

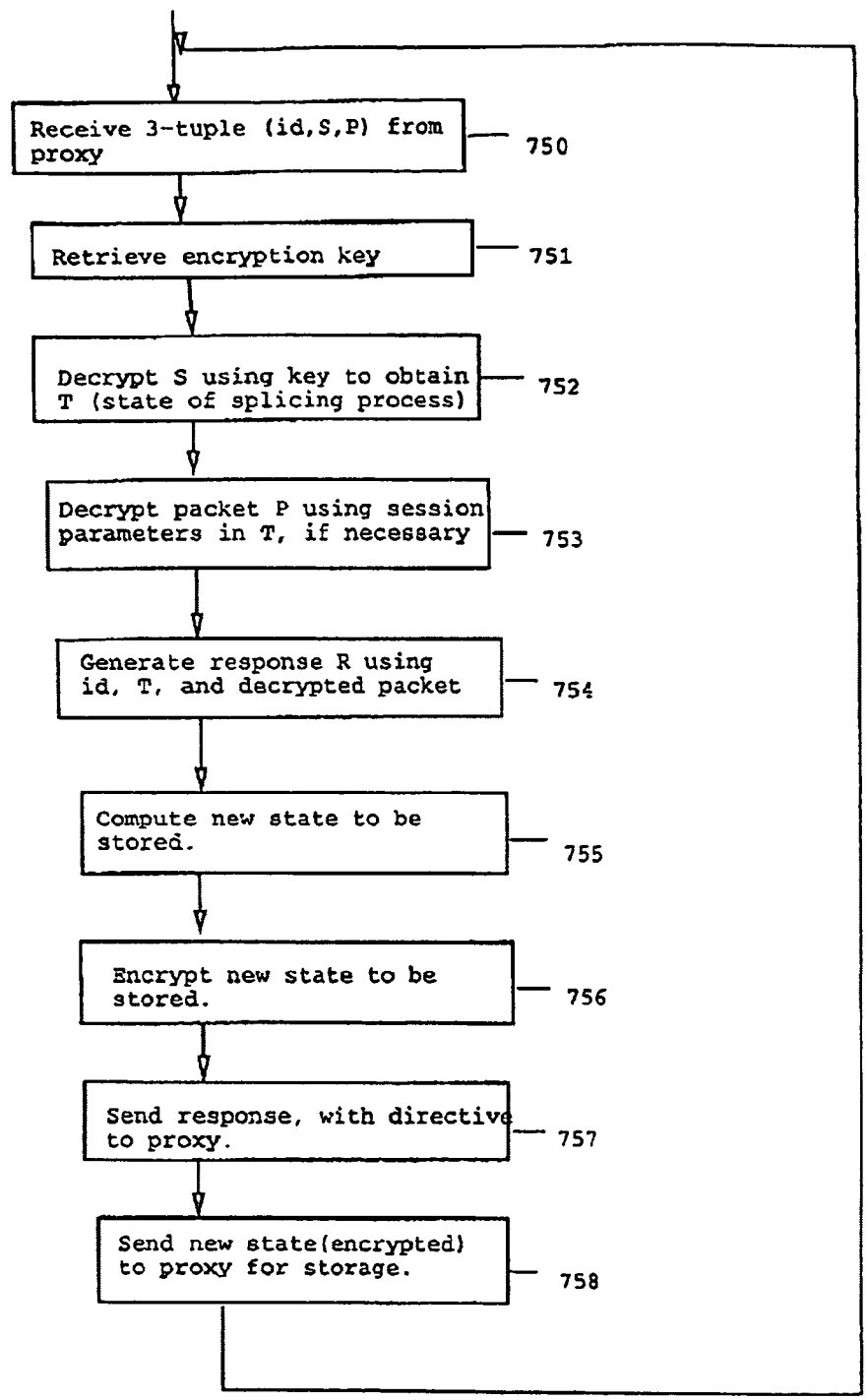
FIGURE 7(b): Description of application process in coprocessor

US 7,430,757 B1

OBLIVIOUS PROXYING USING A SECURE COPROCESSOR

FIELD OF THE INVENTION

The present invention is directed to the field of network security protocols. It is more specifically directed to the field of secure proxying for computing devices.

BACKGROUND OF THE INVENTION

Network security protocols are used to ensure privacy and integrity of communication on an open public network. These protocols are typically intended to achieve end-to-end security guarantees such that the communication is private to the entities who establish the parameters of the secure communication channel.

FIG. 1 shows an example of a typical secure communication between a client 10 and a server 11. The client and the server establish such a secure connection 12 by first establishing the parameters of the connection through a handshake. Here, the client and server can use any of a variety of protocols for communication. Typically the client establishes a connection with the server through the transport protocol. Then they jointly establish the parameters of the secure connection by negotiating the cryptographic material, if any, to be used to encrypt the packets of the communication. Typically during this negotiation phase the peers in the communication authenticate themselves using one of several cryptographic mechanisms. After this negotiation phase, when the client or the server receives a packet, it identifies the peer of the secure connection using the mechanisms of the transport protocol such as socket number, port number etc. This enables the client to identify the secure communication parameters to be used to decrypt or verify the data on the channel used. Without possession of the cryptographic and other parameters of this secured communication channel, no entity can eavesdrop on the contents of the packets. Thus only the client and server can decrypt data sent on this channel. This is a normal trust model for communication between a client and server.

In several applications such as web-browsing, the client and the server wishing to establish a secure connection, do so through a proxy. There are several reasons for this split communication. The proxy is able to log communications initiated by the client. An example is the case of a proxy implementing the SOCKS protocol. Since the network security protocol generally ensures that the communication is private to the client and the server, the proxy functions only as a gateway. It does not see unencrypted information flowing through it, and only relays packets to and from the client to the server.

FIG. 2 shows another client-server usage scenario where the client 10 shown talks to a remote server 11 through a proxy 20. Typical examples of such a scenario are the cases where the proxy implements the SOCKS protocol or is a HTTP proxy. In these scenarios, the proxy is used for several reasons. These include logging the communications initiated by the client (in the case of the SOCKS protocol) or using a caching mechanism wherein the proxy stores commonly requested information (in the case of the HTTP proxy).

In the situation shown in FIG. 2, the dashed lines 23 indicate that when the client ID establishes a secure connection with the server 11, this connection is tunneled through the proxy 20 such that the packets that flow as part of the communication protocol are opaque to the proxy 20. This is achieved, for instance, by encryption of the data flowing between the client and the server. The proxy 20 can not undo the encryptions and any other cryptographic mechanisms used in the secure connection since it does not possess the cryptographic material negotiated between client 10 and server 11 using cryptographic means. In this instance, the protocol 21 that client 10 uses to communicate with the proxy 20 is the same as the protocol 22 that the proxy uses to communicate with server 11. The packets in the protocol are relayed by the proxy 20 without any intervention.

In some application scenarios, where computationally limited clients wish to connect over wireless or other links, the proxy may provide the following additional functionalities:

(a) If the client does not support the same communication protocols as the server, the proxy acts as a converter between the protocols the client supports and those that the server understands. For example, the client may have the protocols specified by the Wireless Applications Protocol (WAP), whereas the server may support only the protocols of the Internet Protocol (IP)

(b) The proxy adapts the content supplied by the server to fit the constraints of the communication links and the computational, functional and graphical constraints of the client.

FIG. 3 shows an example of an application scenario where the client 10 does not support the same communication protocols as the server 11. Thus, for a communication link to be established the client communicates to a proxy 20 using a set of protocols 30 which both the client and proxy support. The proxy 20 then communicates to the server 11 using a different set of protocols 31 which the server 11 supports. If the client 10 wishes to establish a secure connection to the server 11, it can only do so by establishing a secure connection to the proxy which then establishes a second connection to the server. It is important to note that in such scenarios, the trust model of FIG. 1 does not hold. This is because the proxy 20 has to translate protocol 30 to protocol 31 and vice versa, and is thus able to see all the messages that flow between the client and the server. The scenario depicted in FIG. 3 occurs, for instance, if the client only supports the protocols specified by the Wireless Applications Protocol (WAP), whereas the server only supports those of the Internet Protocol (IP). A typical client is a pervasive computing device. In this example, due to the considerable differences in the protocols on either side, the proxy has to decrypt the data exchanged by the client and the server in order to forward it to the other side of the connections.

These requirements of protocol conversion and content adaptation are orthogonal to the end to end security requirements which are: to prevent exposure and modification of content by a third party. It is therefore advantageous to have a system to provide the original end to end security guarantees without modifying the server at the back end. In this way secure communication is possible even without forcing the client and server to support a common set of protocols.

SUMMARY OF THE INVENTION

It is therefore an aspect of the present invention to provide a method, apparatus and system wherein the server embeds at the site of the proxy an application in a coprocessor which performs the functions expected of a proxy without requiring modifications to either the client or the server. This is particularly advantageous when the coprocessor is a secure coprocessor which is a hardware device designed to survive in hostile environments where it may be subject to a variety of security attacks. These attacks may range from attacks to obtain secret information stored on the coprocessor to attacks used to subvert the normal functioning of an application executing on the secure coprocessor. One example of a device which is particularly suited for use in the system implementing the invention is a device which conforms to known tamper resistant standards guidelines. Although, the invention is particularly useful for secure proxying involving pervasive computing devices, it is also advantageous for secure proxying in general computing devices.

In an aspect of the present invention, the invention enables embedding an application inside a secure coprocessor at the site of the proxy to perform functions such as content adaptation and protocol translation. These may be achieved with varying degrees of the following guarantees:

(a) Given that a certain functionality is intended and expected of the application executing on the secure coprocessor, an external agent can neither subvert nor disrupt the execution of such an application.

(b) In typical network security protocols consisting of a client and a server, the trust model guarantees that an untrusted third party can neither eavesdrop nor subvert the communication between the client and the server.

In one embodiment, the same guarantees of such a trust model are obtained even though communication occurs indirectly through the application executing in the secure coprocessor at the site of the proxy.

(c) In some alternate embodiments, the same trust guarantees are obtained by varying levels of modifying the server to support the same protocols as the client. An advantage provided by the method of the present invention is that it is advantageous that no modification be required at the client or the server even if they do not support the same set of protocols.

Another aspect of the present invention is to provide a means by which a server can securely delegate its functions to a coprocessor located in the networking infrastructure. In a symmetric fashion, the invention is used as a means for the client to delegate its functions to the networking infrastructure. Thus in an embodiment the invention provides a mechanism where multiple parties (several clients and servers) use a secure coprocessor in the infrastructure to enforce an arbitrary trust model without modifications to the clients or the servers.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 7(a) shows an example of components of a system to implement the present invention which runs on a proxy;

FIG. 7(b) shows an example of a flowchart of software executing on a secure coprocessor in accordance with the present invention.

DETAILED DESCRIPTION OF THE INVENTION

Figure 1:
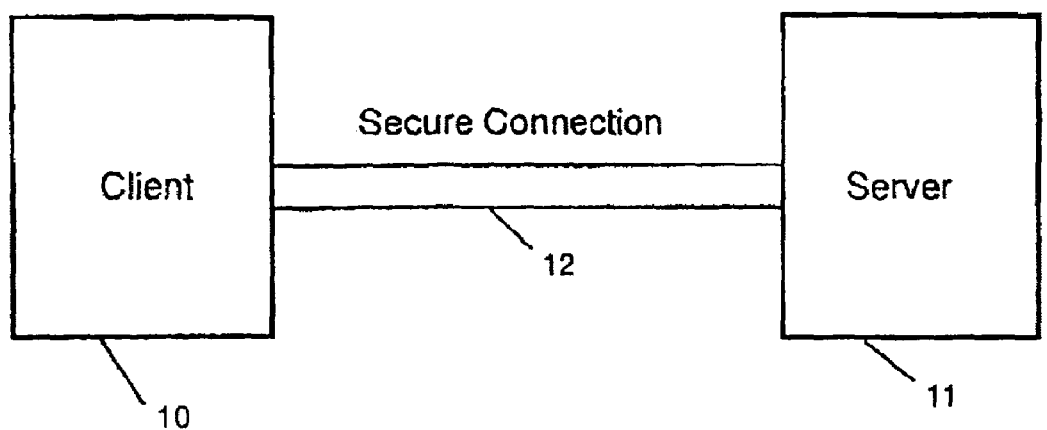
FIG. 1 shows a typical secure communication between a client and a server.
Figure 2:
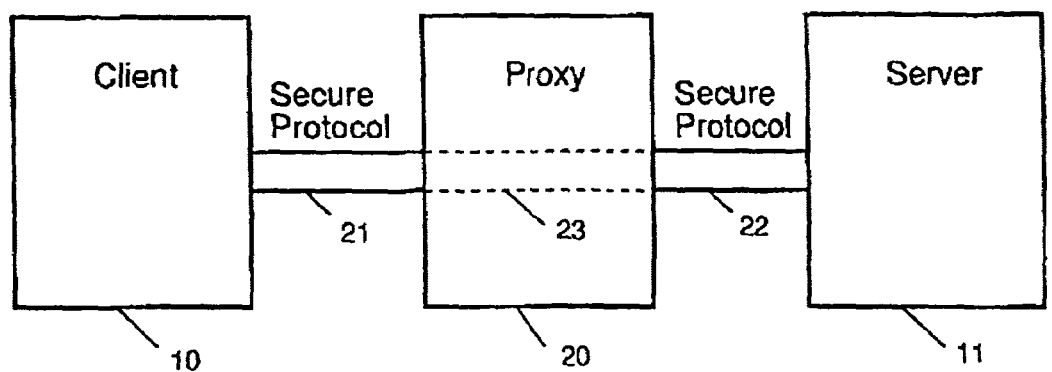
FIG. 2 shows a typical usage scenario where the client shown talks to a remote server through a proxy.
Figure 3:
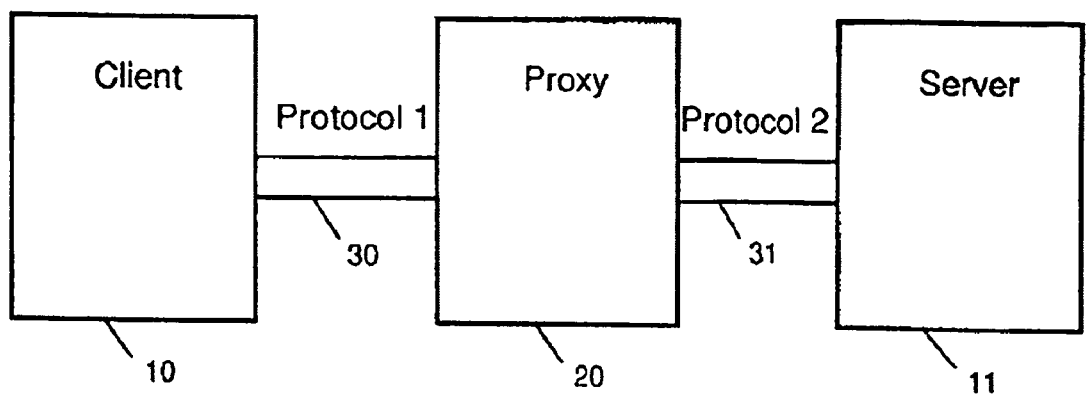
FIG. 3 shows example application scenarios in which a pervasive computing client does not support the same communication protocols as the server.
Figure 4:
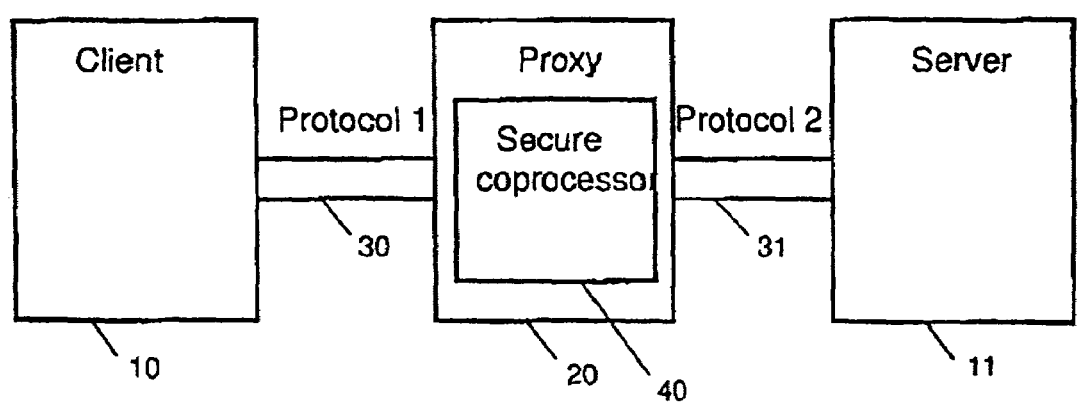
FIG. 4 shows an example of the oblivious proxying scheme in accordance with the present invention.

FIG. 4 shows an example of a system to implement a method of the present invention to ensure that the trust model between the client and the server is not violated even in the presence of a proxy. In this figure, the proxy 20 contains a secure coprocessor 40 as shown. The secure coprocessor is generally implemented in hardware and is designed to survive in hostile environments. A client 10 wishing to establish a secure connection to a server 11, establishes a secure connection 30 which terminates at the proxy. A software component which resides on the proxy forwards the packets to the application in the secure coprocessor 40 without encryption/decryption. The coprocessor 40 processes the packet by decrypting it, performs transformations on the contents as dictated by protocols 30 and 31, and then forwards the contents along a secure connection 31 that it has established to the server. In one embodiment the system includes the secure coprocessor 40 and two pieces of software. One piece of software runs inside the coprocessor 40 and one runs outside on the proxy 20. FIGS. 5, 6, 7(a) and 7(b) show the system in greater detail. In particular, FIGS. 7(a) and 7(b) show flowcharts of the functioning of the different software components. Although, the invention is particularly useful for secure proxying involving pervasive computing devices, it is also advantageous for secure proxying in general computing devices.

It is particularly advantageous when the coprocessor shown in FIG. 4 offers a high level of security against a variety of attacks which can range from physical or other attacks designed to extract secret cryptographic material stored in the coprocessor, to attacks designed to subvert the normal functioning of an application executing on the secure coprocessor. It is particularly advantageous to use prescribed guidelines known to those skilled in the art to achieve a desired level of security against physical and other attacks.

A coprocessor, typically, is a device which can be added as a peripheral device to a computer. It communicates with the host computer using either the Peripheral Component Interconnect (PCI) or the Personal Computer Memory Card International Association (PCMCIA) interfaces. Typically, they are designed to offer tamper resistance through a variety of means including physical tamper resistant shields and software components which guarantee the integrity of applications running inside the coprocessor. Since they are typically designed for use in high security environments they offer, either through software or hardware, a wide variety of cryptographic primitives which are also used in common protocols for secure communication.

In order to implement the scheme described in our invention, the server and/or the client, according to the dictates of their/its security policy, designs one or more of the applications described and physically embeds the coprocessor along with the application at the site of the proxy. A coprocessor can be used in a wide variety of configurations depending on the security model that one needs to implement for a client-server application. For instance, the coprocessor could be deployed at the site of the proxy where the proxy is not trusted by either the client or the server but the tamper resistance of the coprocessor makes it impervious to security attacks by the proxy (or any other party) thereby enabling the client and the server to trust the application executing in the coprocessor.

Another issue relevant to the method of the present invention is a scheme for the client to discover a particular proxy which can securely splice connections to a given server with which the client wishes to securely communicate. Various embodiments are used which depend on the actual transport mechanisms that are used in the communication between the client and the proxy and those between the server and the proxy, there are several schemes to achieve this. For instance, if the transport mechanisms are based on the Internet Protocol (IP) this is accomplished by the use of special ports on the secure coprocessor which are reserved for the particular server. Although the issue of client finding the right proxy to communicate securely with a given server is a very important one, the invention is described without considering this issue. This is because the system implementing the invention is assumes that the proxy which splices connections to the server is known to the client. It should be apparent to those skilled in the art that given a particular transport protocol, any available mechanism may be used to discover the particular proxy which can securely splice connections to a particular server.

Figure 5:
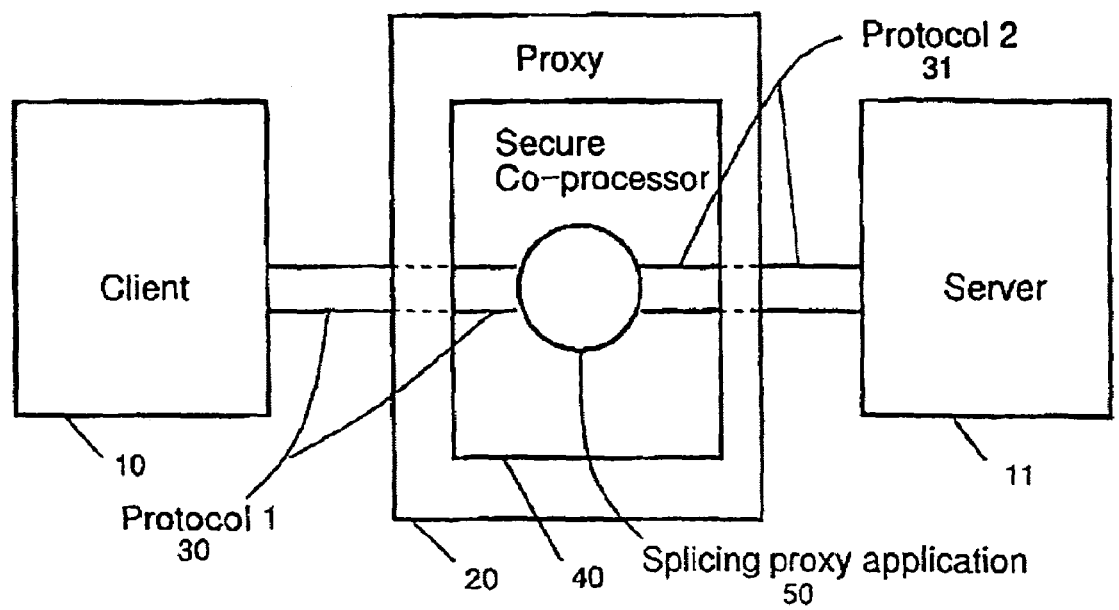
FIG. 5 shows an example of how an oblivious proxying scheme is used to splice secure connections between a client and a server in accordance with the present invention.

FIG. 5 expands on FIG. 4 to show an embodiment of the invention used in a scenario which requires a proxy 20 to splice secure connections between a client 10 and a server 11. The secure coprocessor 40 contains a splicing proxy application 50. This application 50 is designed to translate between secure connections established with protocol-1 30 and a secure connection established with protocol-2 31. It is important to note that the functionality expected of the proxy is done by the splicing application 50 on the secure coprocessor 40. There is no change to either the server 11 or to the client 11. The usual trust model which guarantees that no one other than the server 11 and the client 10 is privy to the contents is enforced since a third party can not subvert the application 50 running inside the coprocessor 40.

Figure 6:
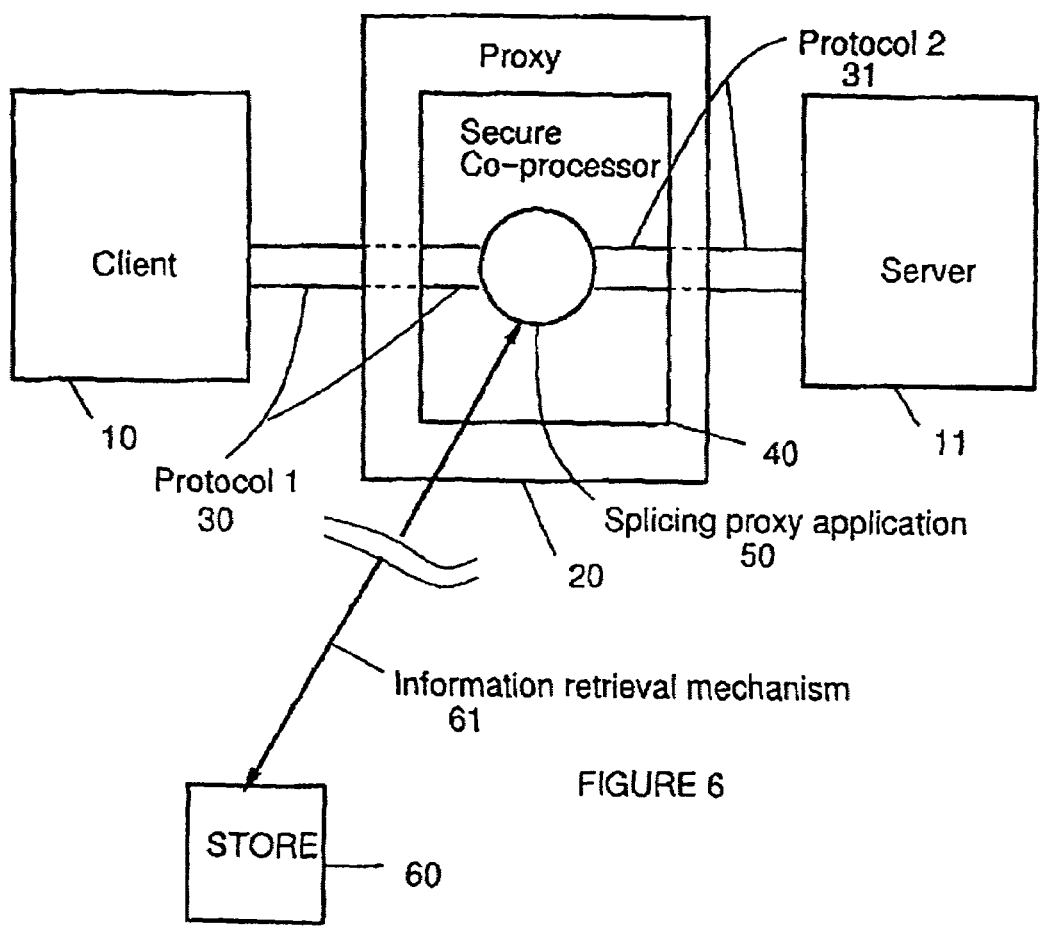
FIG. 6 shows an example of a secure store used by a splicing proxy application to store various information externally without compromising the security and integrity of the information stored externally or violating the trust model.

FIG. 6 shows another embodiment of the splicing proxy application from FIG. 5. In this figure, in addition to the components described in FIG. 5, there is a secure store 60 used by the splicing proxy application 50. In order for the splicing proxy application 50 to splice two secure connections, it stores various information in the secure store 60. The information generally includes such things as the current state of the connections, the parameters negotiated in these connections, the state of the translation process etc. Since a secure coprocessor is a typically a small device, it has limited memory and can not store this information for all the connections. It is advantageous for this information to be stored encrypted using any of the common encryption algorithms, with a key unknown to the proxy 20. This store 60 is either co-located with the proxy 50 on the same machine or it may reside on a different machine. The proxy 20 uses an information retrieval mechanism 61 to retrieve information from the store.

FIGS. 7(a) and 7(b) show flowcharts for an example embodiment of the system components to implement our invention. FIG. 7(a) shows a flowchart, usually implemented in software, of a component which executes on the proxy. This component is intended to implement the transport related functionalities and also to interface between the application running in the coprocessor and the parties to the communication. FIG. 7(b) describes the functionality implemented by the application residing in the secure coprocessor.

In these figures, the protocols between the client and the proxy and those between the proxy and the server are not explicitly described and the flowcharts describe how to implement generic protocol splicing. There are steps performed in these flowcharts which are dependent on the actual communication protocols between the client and the proxy and those between the proxy and the server. Although the description of these steps is done in a generic manner, later we will indicate two instantiations of these steps to splice concrete protocols such as the Secure Sockets Layer (SSL) protocol of the Internet Protocol suite and also the protocols of the Wireless Application Protocol suite. In the description of the steps to implement the invention we do not consider any content transformations other than formatting the data in the packets of one protocol to that of the other protocol. It should be apparent to those skilled in the art that with simple modifications of the software components in the secure coprocessor described in the figure one can implement more general content transformations.

As shown in FIG. 7(a), the component running on the proxy essentially functions as the interface of the application running inside the coprocessor to the external world. Its functionality is to open transport connections to the client and the server, read and write values to the secure store on behalf of the coprocessor application and to forward packets along the two connections.

Step 710 describes the beginning of the splicing operation. It starts when the proxy software receives a connection request from the client at the transport level. For protocols such as the Transmission Control Protocol (TCP), the connection request is the usual socket connect. For unreliable transport protocols such as the User Datagram Protocol (UDP), this step is the receipt of the first communication packet from the client.

In Step 711, an entry is created in the storage module which identifies this client communication. Later, as directed by the coprocessor application, this entry will also be bound to the communication to the server. In fact, the application in the coprocessor often uses this entry as a mechanism for bookkeeping on the splicing process. For instance, it uses this to store the session parameters for the secure communication between the client and the proxy, and likewise for the communication between the proxy and the server. In some other embodiments, such as when the coprocessor application is splicing communication between unreliable protocols, or when it wishes to aggregate packets to perform content adaptation, this entry is used to store a plurality of packets that are received or sent so far, partial results of the content adaptation process etc. In abstraction, we refer to this entry as the state of the splicing process. Since exposure of this state may result in violation of the communication privacy, in general the coprocessor application will encrypt the state using any of several cryptographic means.

The loop shown in steps 712 through 720 is executed for every packet that the proxy receives from either the client or the server. Upon receiving a packet from either the client or the server as shown in step 712 it computes an id of the sender of the packet (steps 713 and 714). It then uses transport level mechanisms to identify the particular communication and retrieves the state of the current splicing which is stored in the storage module (step 715). For instance, if the communication protocols were TCP, then the source addresses and the port numbers through which this packet is carried on can be used to retrieve the particular entry.

In Step 715, a 3-tuple consisting of this retrieved state, the id of the sender and the actual received packet, is formed and forwarded to the coprocessor application. In Step 717, the proxy then waits for a response from the coprocessor application. As we describe later, in step 754 (FIG. 7(b)), upon receiving the 3-tuple from the proxy, the coprocessor application generates a response which includes a directive for the proxy application, based on the 3-tuple and the requirements of the splicing process for these communication protocols.

In Step 718, the proxy application executes the directive in the response generated by the coprocessor application. For generic communication protocols, the following are examples of the responses and directives within these responses. Since we have abstracted away details of the actual communication protocols in this embodiment, we only discuss possible generic responses. Examples include:

(a) Terminate the splicing process: This response is typically generated when the coprocessor wishes to terminate splicing of this communication. This ends the proxy application for this client as shown in step 721.

Note that the proxy handles a plurality of clients, in parallel, using the same steps shown in FIG. 7(*a*).

(b) Open connection to the server: This directive is to open a transport connection to the server.
(c) Forward one or more packets to either client or server.
(d) Close the transport connection to client and/or the server.
(e) NULL response where no further processing is required for this packet.

In alternate embodiments, the coprocessor application may generate a plurality of responses which include directives. In such embodiments, the proxy application will execute each of the directives sent by the coprocessor application.

After generating the response with the directive, the coprocessor application typically computes a new state based on the previous state and the processing it deemed fit for this packet. If the response 719 is not to terminate, a new entry is passed back to the proxy and in step 720 the proxy application replaces the entry in the storage module with this new entry. If the response 719 is to terminate, the process ends 721.

FIG. 7(*b*) describes the functionality implemented by the coprocessor application. In this embodiment we only show how to implement generic protocol splicing. It should be apparent to those skilled in the art, how with modifications, a similar application can be designed to perform content transformations.

The sequence of steps executed by the coprocessor application are as follows. In step 750 it starts with the receipt of the 3-tuple which is sent by the proxy application as described in step 716. This 3-tuple is the id of the sender of the packet (client or server), the state (which as we described is usually encrypted), and the packet which was received by the proxy. In step 751, the coprocessor retrieves the encryption key, if any, which is used to encrypt the state of the splicing process. In Step 752, it decrypts the encrypted state component of the 3-tuple using the key retrieved in step 751 to obtain T, which is the actual state of the splicing process.

As discussed before, T typically contains session parameters associated with the secure communication along the two links and any other state information that is deemed relevant to the splicing of the two protocols. Using the session parameters, depending on the protocol, in step 753, the coprocessor application may decrypt the encrypted packet P. In Step 754, depending on the protocols spliced, the previous state information in T and the new packet that was decrypted in step 753, the coprocessor application generates a response including a directive for the proxy application. Possible responses may include one of the following directives:

(a) Forward a newly computed packet Q to either the client or the server: This response is used in the simple case when the proxy application is used to splice similar protocols and the splicing process only involves decrypting the packet received in step 753 and re-encrypting the packet according to the session parameters of the other link. In this application, the state information T could contain the session parameters of both links.

One particular embodiment is when the coprocessor application is splicing two similar protocols, for example when the communication between the client and the proxy uses the TCP protocol secured by the Secure Sockets Layer (SSL) protocol and so is the communication between the proxy and the server. In this case, the first few packets from the client to the proxy are used to negotiate the session parameters (also known as the handshake packets) for secure communication as dictated by the SSL protocol [SSL]. In this stage, the newly computed packet is the response to the handshake packet received. On receiving the first handshake packet, the coprocessor application also generates a response which includes the directive of opening a TCP connection to the server and another response which includes the directive of sending the initial handshake packet to the server. After the handshake phase, when the session parameters are committed to, the coprocessor application stores the session parameters in the state. Once the handshake phase is complete, the server and the client send encrypted packets to the proxy and upon receiving each packet from the sender, the coprocessor application decrypts in step 754 using the appropriate session parameters, and computes the new packet Q which is the decrypted packet, now encrypted with the session parameters of the other link. The directive in this case, is to forward this to the receiver.

(b) NULL response: This response is used, for example, when the coprocessor application wishes to aggregate a number of packets before processing or if the dictates of the communication protocols do not prescribe any possible action at this instant. In this case as we shall see in step 755, the coprocessor may simply aggregate the received packet into the state T.

For example, one possible embodiment is the case where the coprocessor application is performing the function of splicing between the protocols of the Wireless Application Protocol (WAP) suite and those of the Internet Protocol (IP) suite. WAP is particularly useful for secure proxying involving pervasive computing devices. In the WAP suite, in the session protocols such as WTP, the packets are carried over an unreliable transport mechanism (UDP). One particular embodiment is the splicing of the communication between the proxy and the client which is a transaction protocol of WAP such as the Class 0 or Class 1 transaction, secured by the dictates of the Wireless Transport Layer Security, with the communication between the proxy and the server which is done over the Transmission Control Protocol secured by the dictates of the Secure Sockets Layer protocol. In this case, the packets sent by client to the proxy may arrive out of order or be lost in the communication link. Thus, when the coprocessor application decrypts a packet, it may be out of sequence. In this case, it adds this decrypted packet to the state and issues a NULL response. Later, when missing packets arrive, it can retrieve the sequence of packets it received from the state T. Thus, reliability as dictated by the transaction protocols of WTP can be implemented.

In another embodiment the coprocessor application performs adaptation of content from the server. Typically content adaptations require the proxy to aggregate several packets before it can perform transformations. Upon decrypting the packet, if enough packets have not been received to perform adaptations, the coprocessor application can add this packet to the state and generate a NULL response. When enough packets have been received, it can retrieve all the previously received packets from the state T and perform adaptations. At that stage, the coprocessor application can generate the response of forwarding the (encrypted) result of the adaptations to the client.
  (c) Terminate response: used to halt the splicing process.
  (d) Open connection to server: Generated upon receipt of the first packet from the client or the initial connection request.
  (e) Close connections to the client and/or the server.

After generating the response, in step 755 the coprocessor application computes a new state to be stored as dictated by the communication protocols and the embodiment. In step 756, if necessary, it encrypts this new state. In steps 757 and 758 it forwards the response including the directive and the new state respectively to the proxy application.

Figure 8:
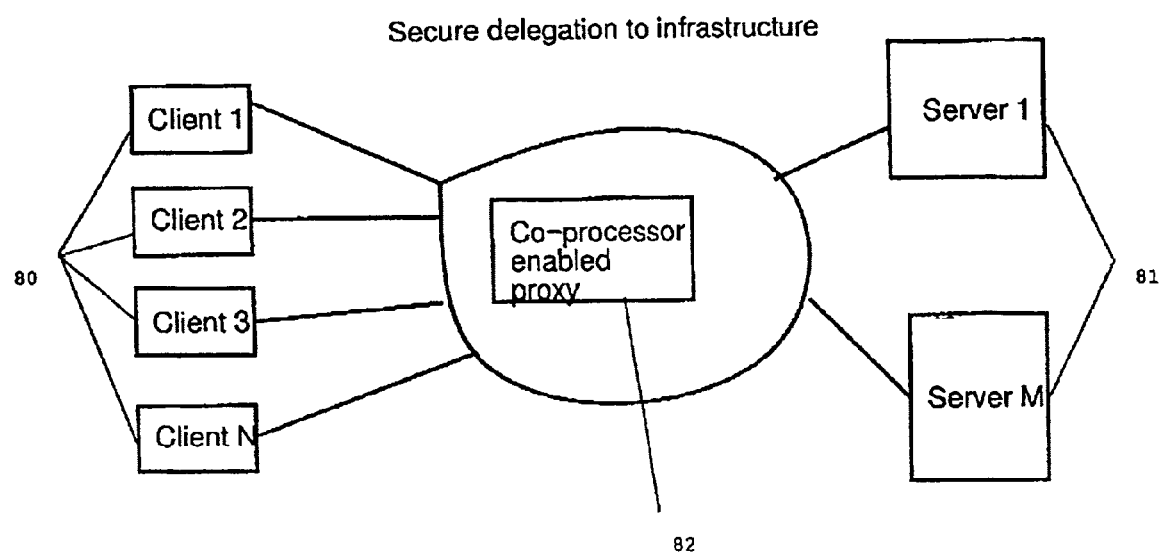
FIG. 8 shows an example splicing together two connections established using the Secure Sockets Layer (SSL) protocol in accordance with the present invention.

In the embodiments described so far, the trust model enforced by the coprocessor was secure communication between a client and server. As depicted in FIG. 8, the techniques mentioned in this invention can be used, in the abstract, to delegate to the infrastructure the task of enforcing more general trust models between a plurality of clients 80 and servers 81, by embedding an application at the coprocessor 82 at the site of an untrusted proxy. The figure shows a secure coprocessor application which is part of the infrastructure and enforces an arbitrary trust model between the set of clients and servers. Each client or server can trigger events expected within this trust model to the coprocessor based application and this can enforce the trust model. The secure coprocessor application can physically be anywhere on the networking infrastructure and need not be physically resident on any of the shown clients and servers.

It is noted that this invention may be used for many other applications. It provides a general mechanism wherein a secure coprocessor is placed in the infrastructure can enforce any arbitrary trust model as required by the set of parties to the computation. The descriptions in the figures are primarily shown for the case when the trust model requires secure communication between a single client and server. Although the description is made for particular arrangements and applications, the intent and concept of the invention is suitable and applicable to other arrangements and applications. For example, the types, sizes and shapes of the protocols used in the communication between the client and the proxy, the number of clients and servers in the trust model and the actual trust model between these client (s) and server (s) can easily be accommodated by choosing the right combination of application on the coprocessor, the content transformations affected by the application on the secure coprocessor and the state that is maintained in the secure storage mechanism. Thus, although embodiments described refer to a 3-tuple, other embodiments can generally employ an n-tuple for the specific communication, where 'n' may be any number suitable to the specific application, not just three. It will be clear to those skilled in the art that other modifications to the disclosed embodiments can be effected without departing from the spirit and scope of the invention.

What is claimed is:

1. A method for providing secure communications on a network, the method comprising:
  providing a secure communication for between a client and a server employing an untrusted proxy by means of:
    employing said proxy between said client and said server to provide connection links between said client and said server;
    embedding a secure coprocessor for use as an agent of said client and/or said server which assures that said proxy cannot tamper with the functioning of said agent and view unencrypted communication between said client and said server, said agent being a software program or hardware logic operating within the confines of said secure coprocessor;
    said proxy receiving a specific encrypted communication request from said client;
    said coprocessor is located at the site of said proxy and:
      (a) acts as a converter between at least one protocol said client supports, and at least one other protocol supported by said server, (b) guarantees that an application embedded in said coprocessor performs to a degree of security proscribed by said client and/or said server;
    said proxy forming an n-tuple for a specific communication;
    said proxy forwarding said n-tuple to said coprocessor;
    said coprocessor generating a response, including a directive to said n-tuple;
    said coprocessor sending said response to said proxy and said proxy implementing a directive; and
    employing the respective security protocols of said at least one protocol and said at least one other protocol;
    splicing a plurality of secure communication protocols of different protocol suites into the agent, wherein the step of splicing a plurality of secure communication protocols is a security protocol of a Wireless Application Protocol Suite (WAP) to that of an Internet Protocol (IP) device, said WAP being used by a pervasive computing device, and said agent performs at least one content adaptation function.

2. A method as recited in claim 1 further comprising the agent performing at least one content adaptation function.

3. A method as recited in claim 2, wherein the step of performing includes maintaining communication privacy.

4. A method as recited in claim 2, further comprising maintaining a state of splicing process resulting from the step of splicing.

5. A method as recited in claim 4, wherein the step of maintaining includes employing a storage device external to the proxy, and using cryptographic means to encrypt the state.

6. A method as recited in claim 1, wherein the splicing includes maintaining end to end security guarantees without a modification to a server involved in the communication.

7. A computer program product comprising a computer usable medium having computer readable program code means embodied therein for providing secure communication on a network, the computer readable program code means in said computer program product comprising computer readable program code means for causing a computer to effect:
  securely embedding an agent at the site of a proxy in the network, and
  splicing a security protocol of a Wireless Applications Protocol suite (WAP) to that of the Internet Protocol (IP) suite.

* * * * *